Oct. 14, 1947.  E. A. BERTRAM  2,428,768
HEAT EXCHANGER
Filed Aug. 22, 1942
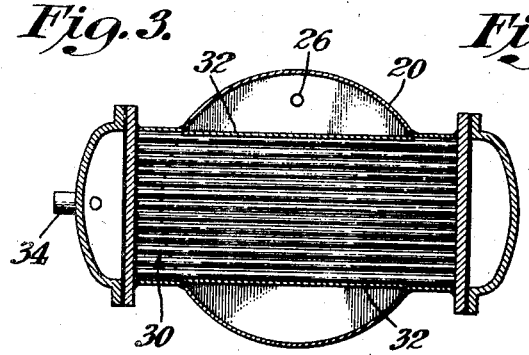
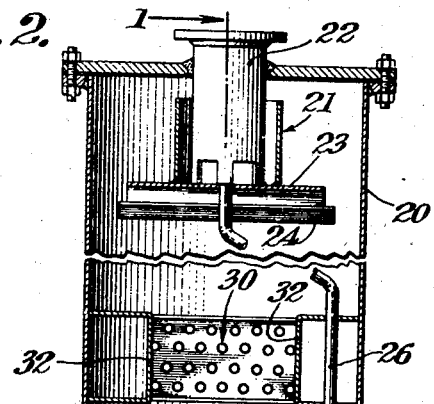
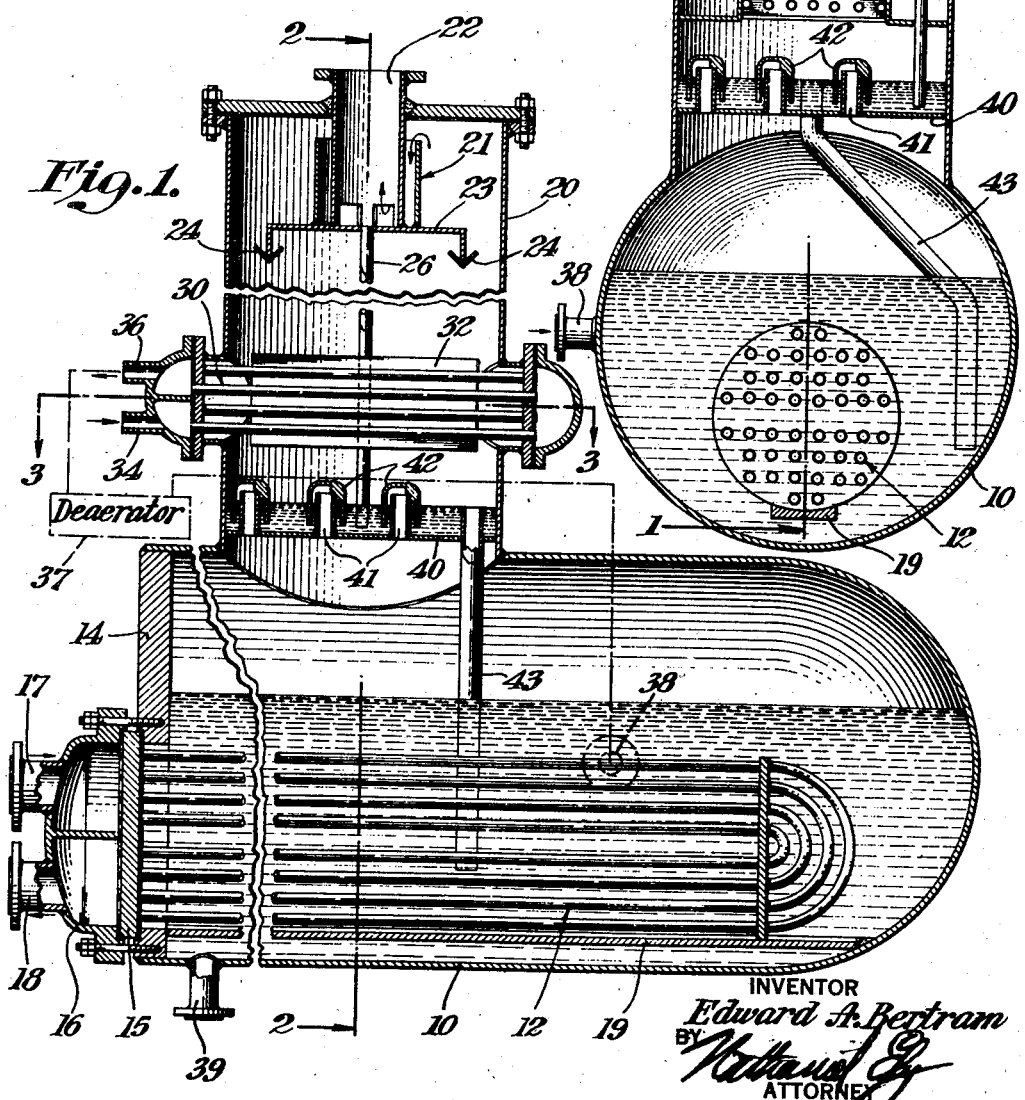
INVENTOR
Edward A. Bertram
BY
ATTORNEY Patented Oct. 14, 1947

2,428,768

UNITED STATES PATENT OFFICE 2,428,768

HEAT EXCHANGER

Edward A. Bertram, Mount Vernon, N. Y., assignor to The Lummus Company, New York, N. Y., a corporation of Delaware Application August 22, 1942, Serial No. 455,773

1 Claim. (Cl. 122—459)

This invention relates to improvements in heat exchangers especially adapted for evaporating water and generally known as evaporators and feed water preheaters.

It is well known that evaporators for evaporating water are generally used for treating the raw feed water for utility plants and for removing salt and other solid impurities from sea water. A high degree of vapor purity may be obtained by such treatment. It has been found, however, that simple evaporation is not always sufficient and that prior methods for improving the operation have usually been unsatisfactory or expensive. This effect results, in part, from the fact that the evaporation of the water causes a concentration of the solids therein and that the water entrained by the resulting vapors contains such solids in greater concentration. In certain cases, therefore, a high degree of effectiveness in separating the entrained solid material is necessary to obtain the desired purity of the vapors.

It is one of the principal objects of my invention to provide an improved form of evaporator so that the solids carried over by the vapors discharged therefrom are present only in the order of a few parts per million of final condensate regardless of the concentration of solids in the liquid being evaporated.

A more specific object of my invention is to provide an improved form of evaporator and vapor purifier for removing substantially all of the solids from a liquid such as boiler feed water.

A still further object of my invention is to provide a vapor purifier for an evaporator in which the scrubbing medium for the vapors comprises a condensate obtained from such vapors and containing a relatively small amount of solid material and in which the condensing effect is obtained by indirect heat exchange of the vapors with the raw feed, which is preheated thereby.

Further objects and advantages of my invention will appear from the following description of a preferred form of embodiment thereof taken in connection with the attached drawings illustrative thereof, in which:

Fig. 1 is a vertical substantially central section through my improved apparatus taken substantially along the line 1—1 of Fig. 2;

Fig. 2 is a central vertical section taken substantially along the line 2—2 of Fig. 1;

Fig. 3 is a horizontal section taken substantially along the line 3—3 of Fig. 1.

In accordance with a preferred form of embodiment of my invention, I provide an evaporator for the production of pure water such as boiler feed water, in which the maximum efficiency of heat transfer is obtained with a minimum loss of sensible heat and in which an unusually high degree of vapor purity is obtained. The evaporator preferably consists of a suitable tank generally indicated at 10, which may be horizontally positioned. This tank is desirably provided with a heat exchanger unit in the form of a tube bundle 12, which may be projected through the head 14 of the tank. The water in tank 10 is maintained at such a level that tube bundle 12 is always completely submerged. Tube bundle 12 includes a fixed tube sheet 15, which is secured to the head of the tank 14 as by means of the demountable channel 16. This channel is provided with the usual inlet and outlet connections 17 and 18 for the heating medium. The U-tube form of tube bundle shown is most satisfactory for this type of service although other arrangements can be utilized. A track 19 is provided to facilitate the removal and insertion of the tube bundle 12. Blowdown connection 39 is provided for periodic or continuous discharge of the concentrated solids.

The heating medium which passes through the tube bundle 12 may be live or exhaust steam and is adapted to vaporize the water contained in tank 10. The resulting steam or water vapors are then removed as, for example, into the vertical dome 20. Ordinarily, these vapors then pass through an entrainment separator 21, which may consist of concentric cylinders as shown or may be of any other type. The vapors, freed of entrained liquid, are discharged through the nozzle 22. A suitable baffle 23, the edges of which may be provided with inverted V-shaped gutters 24, may be provided to carry off separate liquid or condensate to the wall of dome 20 to prevent interference thereof with the rising vapors. Downpipe 26 carries separated entrained liquid from inside of the entrainment separator to below the liquid level on bubble deck 40 hereinafter described.

With a construction of this type, evaporation of the water and some moisture elimination from the vapors are accomplished. Frequently, however, in the evaporation of sea water, for example, the initial salt and solids content of which is approximately 31,000 parts per million, the concentration of solids in the water undergoing evaporation may increase to as much as 65,000 parts per million. Consequently, even with a 99.99% vapor quality, over 6 parts of solids per million remain in the vapors discharged from the evaporator.

One of the principal features of my invention, therefore, is the provision of a vapor purifier intermediate the evaporating stage and the entrainment separating stage. One element of such purifier consists of a bundle of condenser tubes generally indicated at 30, which extend across the vapor dome section 20 and which may be provided with suitable baffles or shrouds 32. These baffles, as shown in Fig. 2, force all of the vapors to pass across the tube bundle 30, whereby at least a partial condensation of the vapors is effected. The resulting condensate serves as a scrubbing medium for the vapors produced in the evaporating tank or section 10 and accomplishes a washing of such vapors before they reach condenser bundle 30. Consequently, the vapors flowing past bundle 30 contain only a relatively small amount of entrained solids because of the washing to which they have been first subjected. This production of scrubbing medium by a partial condensation of the vapors is particularly desirable; for such condensation provides a scrubbing medium having the greatest purity and having the lowest solid content so that effective washing of the entrained solids from the vapors is accomplished.

The cooling medium that I prefer to use in this condenser is the raw water to be evaporated. In this way, I utilize the heat content of the vapors to preheat such water; and loss of heat is substantially prevented thereby. Preferably, the raw water enters the heat exchanger and condenser bundle 30 through the lower nozzle 34, and the resulting heated liquid discharges at 36. This heated water may then pass to a suitable deaerating heater, diagrammatically indicated at 37, for removal of the dissolved air and other gases and may then enter the tank 10 at 38. The tube bundle 30 thus becomes both a preheater and condenser. It is, of course, to be understood that, although the fixed tube sheet construction as shown may be used, a U-tube or a floating head construction may also be used.

Ordinarily, approximately 10% condensation of the vapors in the confined space provided between baffles 32 produces sufficient condensate to wash the vapors and to reduce the solid content thereof to less than one part per million regardless of the concentration of solids in the water in tank 10. Variations in the amount of condensation depend on the temperature of the feed water and of the vapors as well as on the rate of flow of feed water and of vapors. It is preferable, however, to provide sufficient surface so that the water discharging from the condenser section 30 is nearly at the boiling point.

If additional washing capacity is found desirable or necessary, a bubble deck type of washer similar to the construction shown in the copending application of Graham, S. N. 368,981, filed December 7, 1940, may be utilized. In such construction, the bubble deck 40 is indicated as having suitable vapor risers 41, which are surmounted by bubble caps 42. A downpipe 43 maintains the desired liquid level on the deck, whereby the rising vapors are forced to pass through the liquid and are subjected to the washing action of such liquid. In this way, a preliminary washing of entrained solids from the vapors is effected. Downpipe 43 extends below the level of the liquid in tank 10. If desired, more than one bubble deck may be used; but generally one such deck is sufficient to provide for such preliminary washing.

It will thus be seen that scrubbing of the vapors by the condensate either in the restricted zone between the baffles 32 or simultaneously on the bubble deck and again between the baffles removes all but the smallest fraction of the solid material which is carried by the vapors. In this manner, the vapors are subjected to the maximum scrubbing effect by a washing medium having the lowest solid content.

It will be apparent that the particular shape and arrangement of parts is subject to modification except that the preheater and condenser section is preferably built immediately above the bubble deck so that the vapor condensate is also available on the bubble deck for washing purposes. In this manner, the final washing is accomplished by a condensate of vapors which have already been once washed on the bubble deck.

While I have shown a preferred form of embodiment of my invention, I am aware that modifications may be made thereto; and I, therefore, desire a broad interpretation of my invention within the scope and spirit of the description herein and of the claim appended hereinafter.

I claim:

In an evaporator unit including a horizontal tank to contain a substantial body of water, heating means within said tank for vaporizing the water, and a vapor dome borne by said tank at the upper side of the latter and opening at its base into the tank and having a removable upper end wall provided with a vapor outlet; the improvement which comprises, a surface condenser borne by said dome and including a group of tubes extending across the interior of the dome crosswise of the vapor flow to said dome outlet, baffle means mounted within the dome at opposite sides of said group of tubes to direct the vapor through the intertube spaces of the condenser, means to pass raw feed water through said tubes to condense a portion of the vapor passing across the tubes, for washing entrained solids from the vapor by its own condensate, means to conduct said raw feed water, after passing through the tubes, to said tank, vapor-scrubbing means comprising a deck mounted within the dome beneath said condenser tubes to collect the condensate falling therefrom and bubble cap means to constrain all vapor ascending from the tank to the dome to flow through the so-collected condensate, and baffle means within the dome borne by said removable wall in a position above said tubes and constructed and arranged for separation of entrained liquid from the vapor before passage thereof through the outlet and constructed and arranged also for removal from the dome with said wall.

EDWARD A. BERTRAM.

REFERENCES CITED

The following references are of record in the file of this patent:

UNITED STATES PATENTS

| Number | Name | Date |
|---|---|---|
| 6,671 | Stillman | Aug. 28, 1849 |
| 1,352,648 | Beyer et al. | Sept. 14, 1920 |
| 2,103,521 | Luly | Dec. 28, 1937 |
| 2,067,080 | Frankel | Jan. 5, 1937 |
| 2,143,191 | Fletcher et al. | Jan. 10, 1939 |
| 1,996,526 | Serpas | Apr. 2, 1935 |
| 2,286,207 | Keenan, Jr., et al. | June 16, 1942 |
| 2,287,592 | Andrews | June 23, 1942 |
| 2,302,993 | Graham | Nov. 24, 1942 |
| 2,191,671 | Kuhner | Feb. 27, 1940 |
| 2,004,467 | Hawley | June 11, 1935 |
| 2,070,067 | Rice | Feb. 9, 1937 |
| 2,298,287 | Frisch | Oct. 13, 1942 |